May 8, 1951 A. MURRAY 2,552,209

FUSION PHOTOTHERMOGRAPHY

Filed Sept. 17, 1947 2 Sheets-Sheet 1

ALEXANDER MURRAY
INVENTOR

Newton M. Perrins
BY F. W. Emerson Holmes
ATTORNEYS

May 8, 1951 A. MURRAY 2,552,209

FUSION PHOTOTHERMOGRAPHY

Filed Sept. 17, 1947 2 Sheets-Sheet 2

ALEXANDER MURRAY
INVENTOR
Newton M Perrins
BY F M Emerson Holmes
ATTORNEYS

Patented May 8, 1951 2,552,209

UNITED STATES PATENT OFFICE 2,552,209

FUSION PHOTOTHERMOGRAPHY

Alexander Murray, Rochester, N. Y., assignor to Eastman Kodak Company, Rochester, N. Y., a corporation of New Jersey Application September 17, 1947, Serial No. 774,478

2 Claims. (Cl. 101—426)

This invention relates to fusion photothermography which is generically described in my patent applications Serial Numbers 768,977, now U. S. Patent 2,503,758, 768,978, now U. S. Patent 2,503,759, and 768,979, filed August 16, 1947.

The present system of fusion photothermography differs in many ways from those prior systems described in my copending applications and has for its main object the printing of a halftone print directly from a continuous-tone negative. The novelty of the present invention lies not only in the process of printing which may or may not involve the use of a novel type of printing plate herein described, but also in the novel print which results from the process.

A halftone print according to the present invention consists of dark dots of various areas on a light background, but beyond this, the image as printed is not at all similar to ordinary halftone prints. Ordinary halftone prints can be said to be made up of elemental areas with one dot in each elemental area, the size of the dots being proportional to the density. As maximum density is approached the dark dots, of course, overlap and the background appears only as small white dots. In the present invention, however, each elemental area, except those which are in the absolutely clear highlights, has or may have a plurality of dots all of different sizes. In the highlight areas only the smallest dots are printed. The next most dense areas have these smallest dots printed and also the next largest dots. This increase in the number of dots and the size of the largest dot printed in each elemental area continues with increasing density until in the shadow areas, all of the dots in each elemental area print.

The method of printing according to the invention may take various forms but in each of them a single or mono-particle layer of substantially discrete fusible ink elements are placed on or otherwise brought in contact with the surface of the final print support which may be of paper. Each elemental area of the print is provided with elements of various sizes and printing is accomplished by fusing a number of the elements to the final support or by having the melted elements absorbed by the support. In the highlights only the units of minimum size are fused but in other elemental areas the number of units, starting with those of minimum size and in order of increasing size, which is fused, is in proportion to the density required in that area. In one embodiment of the invention the particles of solid fusible ink are arranged in cavities of an intaglio printing plate, the cavities being arranged in the manner just now described for the particles. That is, the intaglio plate is made and then filled with fusible ink in its melted state which is then allowed to harden forming the elements of solid ink in the cavities.

In common with other fusion photothermography processes, the required fusion is provided by irradiating the inked surface. The heat of fusion required to melt the ink in the larger cells is of course greater than that required for the smaller cells hence in the densest region of the negative only enough exposure is given to melt the smallest cells while the larger ones remain intact. It will be noted that the quantity of heat flowing into each of the cells as a result of the radiation, is the controlling factor.

The intaglio printing plate according to the invention does not contain the image. The cavities therein are of various sizes and in general are distributed at random so that in each elemental area of the plate there are a number of different size cavities. These printing plates can be used over and over again and in re-inking the plates it is usually quite unnecessary to empty any of the cells in which ink is left from the previous printing. However, when putting the plates away for storage, or the like or when making a color change, or after a large number of prints have been run, the plate may be cleaned with a warm organic solvent. Alternatively to supplying such intaglio printing plates for inking at the time of use, the plates can be supplied already inked. In this case the plates are usually used only once and either discarded or returned to the manufacturer for re-inking. When inked plates are supplied, they are usually attached to the paper support on which the final print is to be made. This corresponds to the supplying of sensitized photographic paper.

The manufacturing of the plates is accomplished in various ways, the most satisfactory one being as follows: A matrix is first made up by spreading solid particles such as metallic bismuth, silver chloride, lead bromide, lead iodide, cuprous chloride, caesium trisulfide, sodium sulfide or sulphur on a flat support with a plane polished surface such as plate glass, stainless steel, nickel, chromium or even gold plate. The powder is distributed with great care, the size-distribution of the powder being quite important to the quality of the ultimate prints. Lead bromide or bismuth on a glass plate is particularly useful since fused particles of either of these materials are readily obtained in diameters from 4 mu. to 60 mu. and in that range these particles approach hemispheres. The particles are fused to the glass plate and adhere thereto with considerable tenacity at room temperature. In order to obtain the best quality size-distribution, it is sometimes preferable to disperse the particles in some liquid which is removed usually by simple evaporation from the surface after the particles are deposited thereon. Microscopic bismuth spheres dispersed in any of various organic liquids such as acetone work quite well and the spheres are deposited as particles on a glass plate as the vehicle evaporates. Any spheres which are not adjacent and hence not adhering to the glass plate are removed from the matrix by brushing or blowing or simply by casting a plastic layer on the matrix, the first layer thus cast carrying off all the excess particles, for example of bismuth. Heat is applied to melt the particles so that they assume the form of hemispherical droplets. The matrix is then in final form and any number of plates may be cast therefrom although wear and tear on the matrix itself sometimes requires that it be rebuilt after a number of castings have been made. The plastic to be cast is spread on the matrix, allowed to harden, by any of the usual methods of hardening plastic, such as cooling, evaporation or heating, etc. The plastic is peeled from the matrix to form the printing plate of the type here defined and the matrix is ready for reuse in making further such plates.

The plates as thus cast are ready for immediate use with fusible inks which themselves are heat absorbing. However, it is generally desirable to coat the surfaces of the cells with a permanently absorbing layer, for example by blackening the walls of the cells with finely dispersed silver or copper. This heat absorbing layer may be fixed in place, using of course only a minimum quantity of binder which is insoluble in the ink, for example egg albumin.

It should be noted that the cells or individual particles are all much smaller than the elemental areas of the print, i. e. much smaller than $^1/_{2500}$ of a square inch in the case of a 50 line screen. These microscopic dimensions of the cells together with the more or less porous arrangement of the paper stock, in general causes the ink impressions from the individual cells to intermingle and become diffused in one another. While there is an optimum arrangement of cell distribution, it is not appreciably better than that obtained by spreading the particles at random. Since random distribution is much more easily achieved in practice than any complicated regular distribution of the various size droplets, it is the preferable arrangement.

In an alternative method of making cell plates a cellular structure is etched in a metal plate. From this a plastic matrix is molded, from which plastic plates are molded or cast which duplicate the surface of the master etching.

Since this process employs an intaglio plate, a comparison with rotogravure processes appears to be in order. Of course there are many obvious differences involved in the arrangement of the cells and the use of fusion for transference of the ink. In addition, there are many other advantages in the present invention not immediately apparent at first sight. In rotogravure printing where the maximum cell depth is about 50 mu., excessive impression pressures are needed. In the present invention the maximum diameter of the cells is 60 mu. and the maximum depth is only 30 mu. or even less so that the printing pressure need only be moderate. Another difficulty with rotogravure printing occurs in the highlights in that it is difficult to apply the ink uniformly to very shallow gravure cells which are 120 or 150 mu. wide. In the present invention there are no wide shallow cells. In general the cells are hemispherical or approximately hemispherical in shape and hence take the ink uniformly without difficulty.

Various methods of irradiating the printing surface with the negative image are possible. Direct contact methods require that the cellular plate itself be very thin or that the light source be a distant one to give substantially parallel light. Projection printing either a whole surface at one time or by scanning the surface with a line is the most satisfactory of the direct methods. Projection systems all involve somewhat less optical efficiency and hence require greater heat intensity in the source or require long exposure times.

In connection with contact printing, or more exactly the case where the negative is just out of contact with the cells due to the thickness of the printing plate, it is preferable to employ a negative whose dense regions reflect the radiation rather than absorb it. That is, the process requires that the radiation passing through the clear areas of the negative, heat the ink to fuse it. Obviously it would be undesirable to have the radiation which is cut off by the dense portions of the negative heat those portions to such a degree that the heat is transferred, or re-emitted to the ink cells, because this would tend to melt the ink adjacent to the dense portions of the negative as well as the ink adjacent to the clear portions of the negative. Thus the most preferable form of negative for contact printing is one containing a variable opaque image of white or other reflecting material, reflecting both visible and infrared. One satisfactory form of such an image is a silver-free gelatin wash-off relief image in which lead carbonate has been deposited by precipitation. A titanium oxide dispersion is another suitable reflecting material. Silver iodide works to some degree for this purpose, but it tends to transmit too much infrared.

Another slight variation of the present printing process which allows the negative to be in close contact with the ink surface is as follows: The white negative of the type just described is placed adjacent to the cellular surface during exposure by a radiator. The ink is melted and while in the melted condition is immediately transferred to the final print support by pressure contact. The more direct methods have the advantage, however, of more accurate control since even a short interval of time between fusion of the ink and transference to the paper stock tends to allow some of the ink cells to re-solidify, and this solidification is not uniform and is difficult to control.

The cellular printing plate has an incidental advantage over other photothermographic processes. Many fusible materials have the habit of crystallizing. Some also appear to have a slight etching action when coated onto a gelatin image, for example. The cellular printing plate according to the present invention eliminates the difficulties which arise from either of these characteristics of fusible materials. Thus the choice of materials to use as the fuser is widened and the other properties such as permanence and ability to produce highly saturated yellow, magenta and cyan hues largely govern the choice. For example, acetamide was not included in the group of fusers described in my above mentioned copending applications on fusion photothermography. It is water soluble and cannot be printed from an ordinary photographic positive as described in those copending applications without injuring the gelatin. It is reasonably satisfactory for the present process, however, and it melts about 76–78° C. The melted fuser must not be a solvent or plasticizer for the plastic material of which the cellular plate is made.

The other embodiment of the present invention which eliminates the cell plates entirely has the advantage of simplicity. In my copending application on fusion photothermography the processes tend to give somewhat less maximum color saturation than certain other color printing processes. A change from benzophenone prints to the use of gelatin jelly inks which can be melted photothermally and transferred to oiled papers which rejects unmelted jelly gives results which are better in some respects but not as uniform even when the jelly inks are dispersed in oils by emulsifying agents. Combining the jelly ink with immiscible organic fusers, grinding the crystals and jelly together to form a paste also gives a useful color print but again uniformity is difficult to control. Dispersion of the jelly in melted form in a melted organic fuser, i. e. emulsifying of the jelly in the fuser is obtained by dispersing calcium oleate in the mixture. Specifically methyl-o-benzoyl benzoate was separately emulsified in the gelatin. The paste is spread on a glass plate which is then allowed to cool causing the methyl-o-benzoyl benzoate to solidify gradually. The pigmented gelatin is then in discrete microscopic particles interspersed with colorless methyl-o-benzoyl benzoate. This mass can be re-dispersed with great ease simply by rubbing or grinding with cold water. The result is a cream or paste with microscopic discrete pigment jelly fragments emulsified in water plus microscopic colorless crystals of methyl-o-benzoyl benzoate also dispersed in the water. Even relatively brief grinding produces emulsions with the jelly fragments less than 10 microns in diameter. A quantitative example of a blue ink is as follows: 51 parts of 10% jelly containing 9 parts of water to 1 part of gelatin is combined with 9 parts of peacock blue concentrate which is a phthalocyanine pigment. The other phase consists of 39 parts of methyl-o-benzoyl benzoate and one part of calcium oleate. These are emulsified together and two parts of the dry mass thus made are dispersed in one part of water. The melting point of the methyl-o-benzoyl benzoate is about 121° F. and when fused the ink appears to be a colloidal dispersion. It is odorless and does not grease-mark paper. This particular printing ink is useful in the cellular plates according to a preferred embodiment of the present invention or in the fusion photothermographic processes described in my copending applications referred to above.

The operation of the present invention will be fully understood from the following description of preferred embodiments thereof when read in connection with the accompanying drawings, in which.

Figures 7, 8, 9, 10:
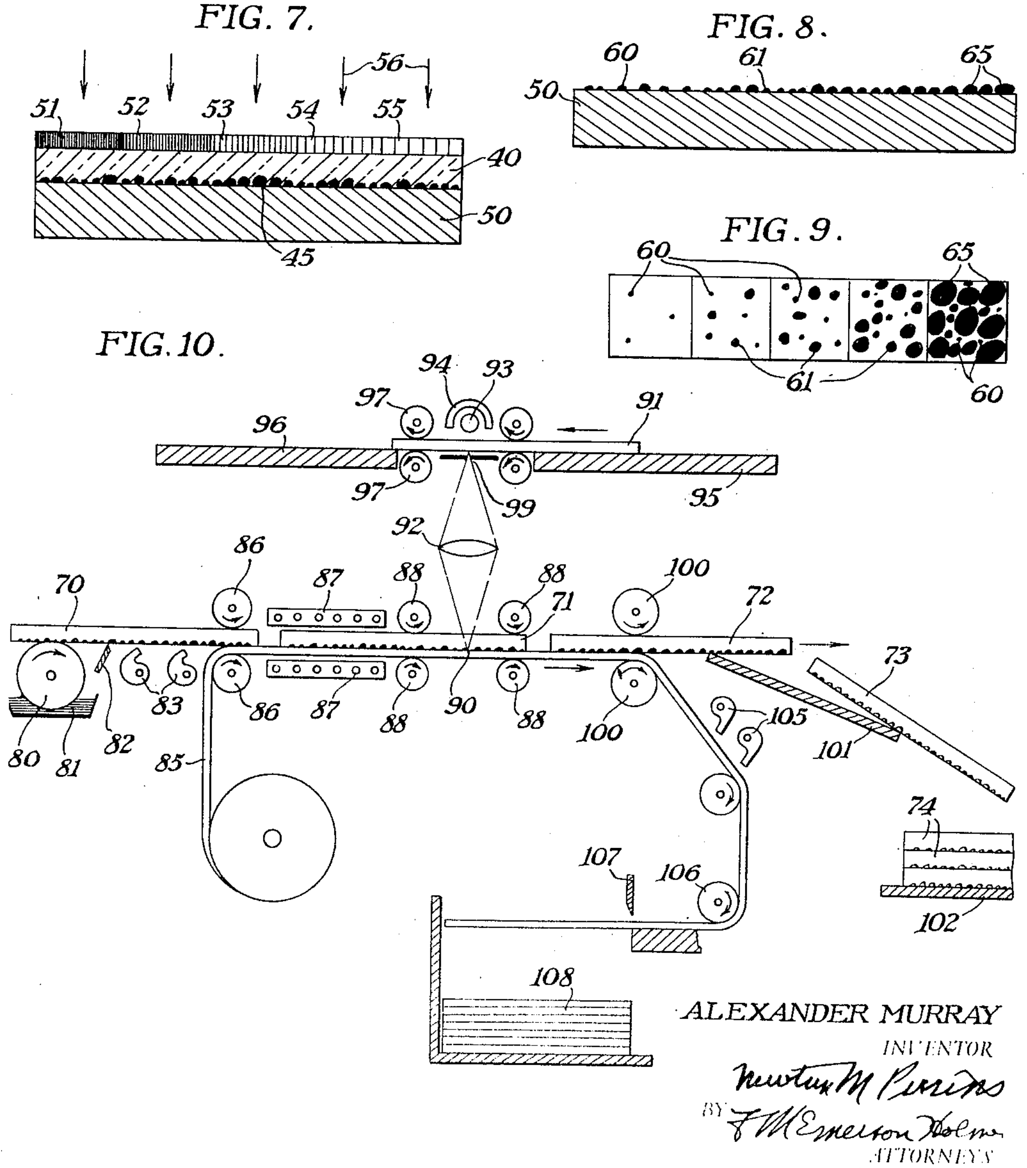
Fig. 7 illustrates the printing of a minute step tablet according to the invention.
Fig. 8 and Fig. 9 are a cross-section and top view of the resulting print greatly magnified.

Fig. 10 schematically illustrates a direct semi-continuous printing process according to one embodiment of the invention.

Figure 1:
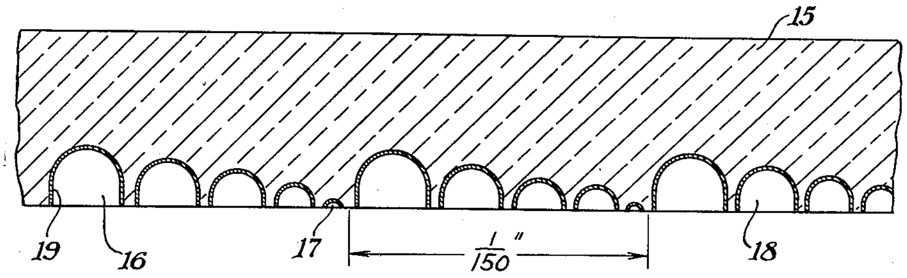
Fig. 1 is a highly magnified cross section of a cellular printing plate according to one embodiment of the present invention.

In Fig. 1 a plastic sheet 15 is provided with a large number of cavities on one surface thereof including large cavities such as 16, minimum size cavities such as 17 and medium cavities such as 18. This particular sheet is intended for use in 150 line quality halftone printing, and therefore in each element of the plate 1/150 of an inch in diameter there is a large cell, a small cell and a number of intermediate size cells. Generally speaking the cells are randomly arranged over the plate surface and the maximum size cell in one element may not quite equal the diameter of the maximum size cell in another element, but there must be a range of sizes from a very small one to a very large one in each elemental area. When the plate is used with heat absorbing ink, the plate is generally perfectly transparent. To increase the efficiency of heat absorption, however, especially when the ink itself does not have adequate heat absorbing properties, the inner surface 19 of each cell is coated with a heat absorbing material such as finely dispersed silver or copper fixed in place with a suitable binder which is insoluble in the ink.

A preferred method of making such a plate is illustrated in Figs. 2A to 5 in which a glass or steel plate 21 is provided with a thin layer of adhesive 22 and a layer of microscopic bismuth spheres varying in size from 4 mu. to 60 mu. dispersed in an organic liquid. The layer of spheres 23 is shown being poured from a container 24. Certain of the spheres 25 as shown in Fig. 2B are adjacent to the base plate 21 and adhere thereto. Other spheres such as 26 do not touch the base plate 21. The organic liquid 27 evaporates leaving the bismuth spheres lying on the plate. Thus spheres such as 26 which are not in contact with the adhesive surface 22 are then bushed away either by an air blast or a mechanical brush 28 as shown in Fig. 3A. This leaves a single layer of bismuth spheres 25 on the base plate 21 as shown in Fig. 3B. Hemispherical shape and greater adhesion are obtained by heating the base plate above the melting point of the particles after it is coated with particles as shown in Fig. 3B.

Another simple method of making the master plate which is quite satisfactory for most purposes is to employ a copper plate or other etchable metal plate. This is treated with a photo resist in the usual way which is exposed to a pattern of dots of the various sizes required preferably by reduction printing from a large master picture. The resist is developed and part of it removed in accordance with the pattern and then the plate is etched through the openings in the resist. The recesses thus produced have a depth proportional to their width because of the small size of even the largest of the pits. From this etched intaglio plate, a matrix is cast from which successive printing plates are to be made. That is, the matrix corresponds to the mold shown in Figs. 3A and 3B.

Figures 2A, 2B, 3A, 3B, 4, 5:
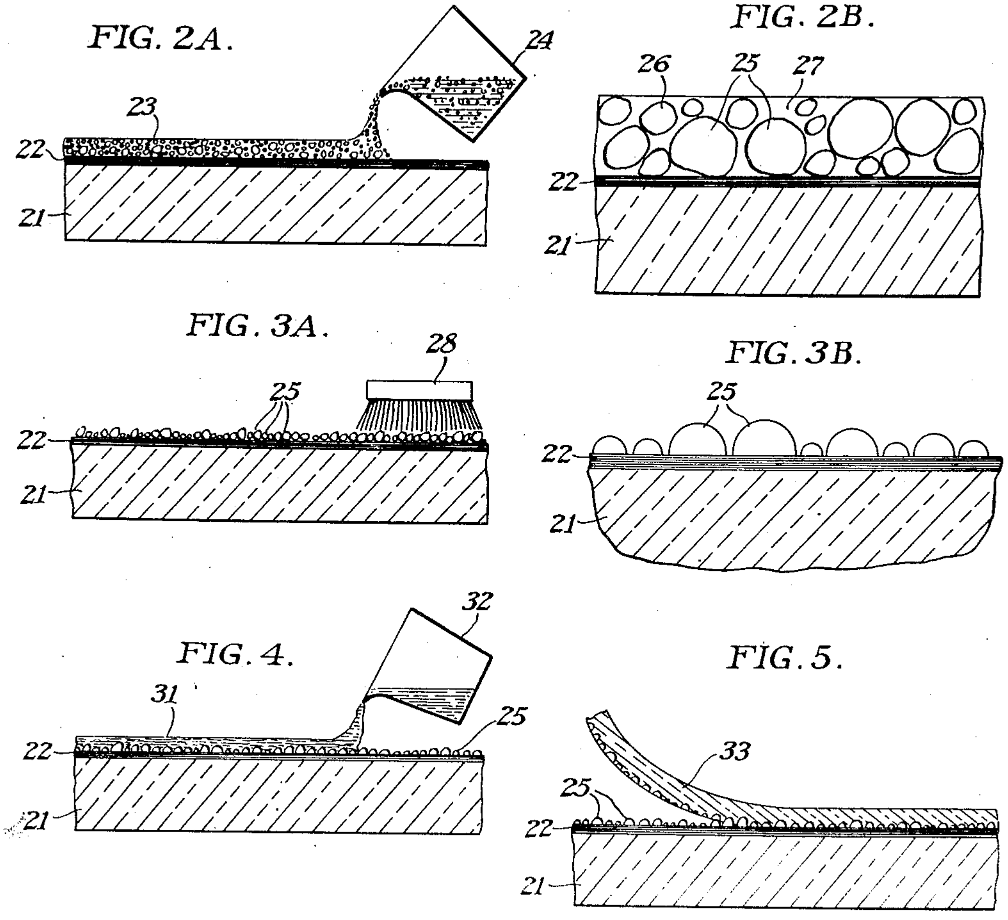
Figs. 2A, 2B, 3A, 3B, 4 and 5 illustrate a preferred method of manufacturing such a printing plate.

In Figs. 3A and 3B the matrix consisting of the base plate 21 and the layer of bismuth hemispheres 25 is cooled and then is coated with a plastic layer 31 from a container 32 as shown in Fig. 4. The plastic is allowed to harden and stripped from the matrix to form a printing plate 33 as shown in Fig. 5. Another method is to mold the plastic with heat in a hydraulic press.

Figure 6A:
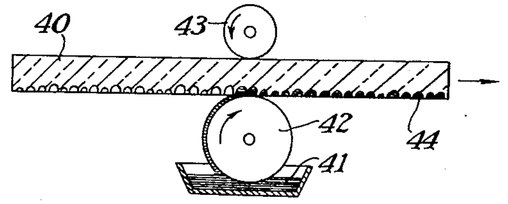
Fig. 6A illustrates the inking of the plate.
Figure 6B:
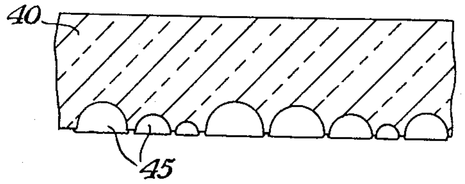
Fig. 6B is a highly magnified cross-section of an inked plate.

Such a printing plate is shown at 40 in Fig. 6A and is passed between rollers 42 and 43, the roller 42 picking up melted ink 41 and spreading it on the intaglio surface of the plate 40. This liquid ink 44 is then allowed to cool forming solid particles 45 as shown in Fig. 6B in the cells of the plate 40. Either the cell plate 40 before inking or the inked plate as shown in Fig. 6B may be marketed as a product ready for use.

According to the invention the inked plate 40 with solid fusible ink 45 in the cells of the printing surface thereof is placed in contact as shown in Fig. 7 with a final print support 50 such as paper. The plate 40 is purposely extremely thin and a negative to be printed is placed in contact with the back surface thereof. In order to illustrate the invention, Fig. 7 shows a negative in the form of a step tablet having steps of decreasing density indicated at 51, 52, 53, 54 and 55. The negative is illuminated from behind by radiation indicated by arrows 56. As pointed out above the high density steps such as 51 of the negative preferably reflect the radiation and the low density steps transmit the radiation to and through the plate 40 to melt the ink 45 in the cells. Since the radiation through the step 51 is of low intensity there is only sufficient heat to melt the smallest particles of ink fusing them to the support 50 as dots 60. The minute cells tend to fuse as a whole or not at all. In the next step 52 of the tablet there is slightly lower density so that a greater intensity of radiation is transmitted, melting not only the smallest particles of ink forming spots 60 but also the next size particles forming spots 61. The radiation through step 53 adds the next size to the spots and so on up to the clear area 55 which transmits sufficient radiation to print all of the ink particles including the largest ink particles forming large spots 65. For purposes of illustration each size of spot is arranged in the same relative position in each step in Fig. 9, but of course in practice this would not occur. Also in practice the areas of maximum printing density are printed more nearly solid than shown in the right hand step of Fig. 9, but for purposes of clarity in Fig. 9 considerable clear area is left between the spots. This form of halftone print illustrated in Fig. 9 is quite unique. In practice there is considerable tendency for the spots to merge and run into one another due to the porosity of the printing surface and the fact that the spots themselves are very small, there being a large number of spots corresponding to each elemental area of print. This is not objectionable, however, and merely tends to make the halftone print appear more like a continuous-tone print.

In Fig. 10 a whole series of printing plates 70, 71, 72, 73 and 74 are passed through a printing press for making successive prints from a single negative 91 which is repeatedly moved across the printing aperture. The printing plate 70 is in the position in which it has just picked up in 81 from an ink roller 80, any excess ink being removed by a doctor blade 82. The ink 81 is at an elevated temperature and in melted condition. Blasts of cold air from blowers 83 cool this ink and solidify it in the cells of the printing plate 70. The inked surface is then pressed into contact with a roll of paper 85 by pressure rollers 86 and the sandwich is passed between heaters 87 to raise the temperature at the printing surface uniformly to a point just below the melting point of the ink. The plate continues to move forward to the position 71 between guide and driving rollers 88. At the point 90 a high intensity infrared image scans the plate. This image is formed by a lens 92 from a negative 91 illuminated by an infrared source 93 which is provided with a gold plated reflector 94. The negative 91 is moved from one table 95 to another table 96 by means of driving rollers 97, synchronized with the driving rollers 88 so that the scanning image at the point 90 moves synchronously with the moving band of paper 85. The point 90 is actually a line across the width of the printing plate 71, the thickness of the line being defined by the lens 92 and the mask 99 forming the gate adjacent to the negative 91. Ink from the plate 71 is melted, transferred and fused to the support 85 in accordance with the intensity of the image at the point 90. The printing plate as shown in position 72 then moves away from the paper 85 carrying with it all unfused ink including that in the larger cells. After passing through the drive rollers 100 the plate 72 and the paper 85 separate and go their separate paths. The plate 72 passes across a sloping table 101 as shown at 73 and slides into a pile of previous plates 74 on a catching table 102. With most inks, it is possible to return these plates immediately to the input side of the press for re-inking although it is desirable occasionally to clean up the plates completely by uniformly heating and transferring all of the ink to a separate support. The paper 85 after passing the roller 100 moves past air squeegees 105 which remove any unfused ink which may have accidentally transferred to the paper surface. The paper then passes around roller 106 to cutters 107 which cut the separate prints and pass them to a stack 108.

The arrangement shown in Fig. 10 is a simple relatively inexpensive one and it permits the use of the least expensive form of printing plate. However, it is obvious that the printing plate such as 70 to 74 can be arranged on the surface of a cylinder to move continuously through the press including the inking, cooling, preheating, exposing and cleaning stages back to the re-inking one.

Having thus described the preferred embodiments of my invention, I wish to point out that it is not limited other than as set forth in the accompanying claims.

I claim:

1. The method of printing which comprises placing in contact with the surface of a final print support a substantially mono-particle layer of substantially discrete fusible ink particles, each elemental area of the print being provided with particles of various sizes from a minimum to a maximum, and in each such elemental area, fusing to the support a number, starting with the minimum and in order of increasing size, of particles in proportion to the density required in that area and removing unfused particles from the surface of the support, in which said fusing step consists of bringing the layer of ink particles and the adjacent support surface uniformly to a temperature just below the melting point of the ink and irradiating the ink layer with a continuous tone negative image of the print to be made, with sufficient intensity and for sufficient time to fuse in the highlight areas of the print only the particles of minimum size, the highlight areas referred to being those requiring a density just greater than that of clear background in the print.

2. The method of printing which comprises inking up with fusible ink at a temperature above the melting point of the ink which is above 100° F., an intaglio printing plate having at least 50 elemental areas per linear inch and having in each element a series of cavities of various sizes from a minimum to a maximum, bringing the plate to a temperature just below said melting point to solidify the ink in the cavities, placing a final print support in contact with the inked surface of the plate, irradiating the inked surface with a continuous tone negative image of the print to be made with sufficient intensity and for sufficient time to melt the ink in all of the cavities in the elemental areas at points of maximum intensity of the negative image, to melt none of the ink in cavities in the elemental areas at points of minimum intensity in the negative image and at points of medium intensity of the negative image to melt the ink in a number of the cavities beginning with the minimum size one, the number and the size of the largest one melted being proportional to the intensity of the negative image in that element, and removing the final print support with the fused image therein from the surface of the printing plate.

ALEXANDER MURRAY.

REFERENCES CITED

The following references are of record in the file of this patent:

UNITED STATES PATENTS

| Number | Name | Date |
|---|---|---|
| 923,799 | Saalburg | June 1, 1909 |
| 1,773,887 | Stirling | Aug. 26, 1930 |
| 1,874,427 | Billings | Aug. 30, 1932 |
| 1,911,592 | Supligeau | May 30, 1933 |
| 2,010,042 | Stirling | Aug. 6, 1935 |
| 2,032,541 | Losier | Mar. 3, 1936 |
| 2,226,086 | Wilkinson | Dec. 24, 1940 |
| 2,234,133 | Sorkin | Mar. 4, 1941 |
| 2,268,594 | Huber | Jan. 6, 1942 |
| 2,294,644 | Wurzburg | Sept. 1, 1942 |
| 2,294,645 | Wurzburg | Sept. 1, 1942 |
| 2,422,022 | Schulz | May 25, 1948 |
| 2,482,638 | Schultz | Sept. 20, 1949 |